United States Patent [19]

Stilling

[11] Patent Number: 5,698,256
[45] Date of Patent: Dec. 16, 1997

[54] BLOOD SUGAR DECREASING BAKED PRODUCT FOR DIABETICS AND A POWDERY MIX FOR PRODUCING SAME

[76] Inventor: Birgitte Stilling, 28, Esplanaden, DK-1263, Copenhagan K, Denmark

[21] Appl. No.: 356,253

[22] PCT Filed: Jun. 28, 1993

[86] PCT No.: PCT/DK93/00212

§ 371 Date: Feb. 7, 1995

§ 102(e) Date: Feb. 7, 1995

[87] PCT Pub. No.: WO94/00995

PCT Pub. Date: Jan. 20, 1994

[30] Foreign Application Priority Data

Jul. 6, 1992 [DK] Denmark ................ 0882/92

[51] Int. Cl.⁶ .................................................. A23J 3/14
[52] U.S. Cl. ................. 426/656; 426/549; 426/550; 426/555; 426/558
[58] Field of Search ........................... 426/558, 656, 426/550, 555, 804, 615, 549

[56] References Cited

U.S. PATENT DOCUMENTS

| | | | |
|---|---|---|---|
| 3,348,951 | 10/1967 | Evans | 99/86 |
| 3,930,055 | 12/1975 | Engelman et al. | 426/644 |
| 3,995,065 | 11/1976 | Titcomb et al. | 426/62 |
| 4,109,018 | 8/1978 | Thompson | 426/62 |
| 4,442,132 | 4/1984 | Kim | 426/549 |
| 4,824,683 | 4/1989 | Hodgson et al. | 426/62 |

FOREIGN PATENT DOCUMENTS

| | | |
|---|---|---|
| 2438597 | 2/1976 | Germany. |
| 3026598 | 2/1982 | Germany. |
| 2847876 | 12/1982 | Germany. |
| 3235269 | 3/1984 | Germany. |
| 3504596 | 8/1986 | Germany. |
| 3614465 | 11/1987 | Germany. |
| 4001905 | 7/1991 | Germany. |
| 2022391 | 12/1979 | United Kingdom. |

OTHER PUBLICATIONS

Dialog Information Service, File 351, WPIL, Dialog accession No. 004157535, WPI accession No. 84–3030749/49 (NISO), "Novel food material prepn. by binding powdery edible fibre to protein," & JP,A,59187745, publ. 841024.

*Primary Examiner*—Donald E. Czaja
*Assistant Examiner*—Lien Tran

[57] ABSTRACT

A baked product having a blood sugar reducing effect for diabetics is manufactured by baking of a dough that contains the following ingredients: (a) soya protein, (b) a fiber component containing at least 50% by weight of wheat bran, (c) vegetable oil, (d) a fat-containing, substantially starch-free nut and/or kernel component, (e) a preferably viscous, possibly protein enriched, low-fat sour milk product, possibly in the form of a dry powder, (f) egg white, possibly in the form of a dry powder, and (g) a leavening agent, the weight ratios of the ingredients, calculated on dry matter, being as follows: (a) to (b) from 0.3 to 3 (understood as the value of a/b being in the interval from 0.3 to 3), ((a)+(b)) to (c) from 3 to 8, ((a)+(b)) to (d) from 3 to 7, ((a)+(b)+(d)) to (e) from 8 to 12 and ((a)+(b)+(d)) to (f) from 12 to 20. The product is a bread-like product, which in isocaloric amounts can replace conventional bread whereby a long-acting blood sugar reduction is obtained.

15 Claims, 2 Drawing Sheets

BLOOD SUGAR DECREASING BAKED PRODUCT FOR DIABETICS AND A POWDERY MIX FOR PRODUCING SAME

INTRODUCTION AND BACKGROUND

The present invention relates to a bread-like product having a blood sugar reducing effect for diabetics, and a powder mix, which upon mixing with water and vegetable oil forms a dough, that may be baked to a bread-like product having blood sugar reducing effect for diabetics.

It is well known among nutrition experts that the diet for diabetics should be adapted so that occurrence of high blood sugar concentrations is prevented.

The most obvious way of avoiding undesirably high blood sugar concentrations is to reduce consumption of digestible carbohydrates including starch.

However, with the selection of foods generally available it is difficult to establish a diabetic diet which ensures the blood sugar concentration being kept at sufficiently low levels while at the same time ensuring that the patient gets sufficient and appropriate nutrition in general and that the meals appear as normal and tasty meals fitting into common eating habits.

To reduce consumption of starch it has been proposed to replace the patients' consumption of bread totally or partly by the consumption of various substitutes thereof.

The bread replacement products so far proposed, however, have all shown various disadvantages such as: Too high protein content, which may cause renal trouble, a taste, consistency or physical appearance deviating from those of bread to such an extent that the products are not regarded and accepted as bread replacement, or the products have contained such large amounts of industrially manufactured, partially synthetic ancillary ingredients, which are normally not present in such amounts in ordinary bread, that the bread substitutes were not accepted as "natural" foods.

Thus, from DE-A-24 38 597 a low carbohydrate pastry for diabetics is known, which contains less than 4% digestible carbohydrates, the sugar having been replaced by a sugar substitute such as sorbitol, and the flour having been replaced by a flour substitute mix that contains wheat gluten, soya protein and a thickening agent such as locust bean flour, gum arabic or a cellulose derivative such as methylcellulose or carboxymethylcellulose. Such pastry will have no similarity to bread and as appears from the published patent application the invention described therein relates to cake or biscuit-like products the role of which in a diabetic diet would be very limited.

From DE-B-28 47 876 it is known to manufacture a pastry with a particularly high protein content from wheat gluten, bran, milk protein, soya protein, salt, yeast, and water. However, the invention described therein relates to brittle, rather snack-like products, which have no similarity with real bread and besides they contain protein in amounts that are too large for the product to be suitable as bread replacement in a diabetic diet. Furthermore, the product is almost without any content of food fibres. The application as bread replacement for diabetics is not mentioned in the patent specification either.

Gluten-based baked products with a reduced starch content are known from U.S. Pat. No. 3,348,951. It is stated therein that the products may be manufactured with a bread-like appearance, they would, however, not be suitable for diabetics because they have a too large starch content. This is due to the fact that the products may contain a considerable amount of flour and that the gluten qualities used in the bakeries usually contain some amounts of starch, gluten completely free of starch providing a far too hard texture to the baked product. Furthermore, the large proportion of gluten provides a protein content of the product larger than appropriate for diabetics.

GB-A-2 022 391 is directed to a bread that besides flour contains from 5 to 50% of non-assimilable carbohydrate based gum or mucilage products, such as guar gum, locust gum, pectin or watersoluble alkylcellulose together with gluten in an amount that is sufficient for stabilization of the bread texture. It is stated in the patent application that the bread has a reducing effect on the cholesterol and glucose content of the blood. Such bread must be regarded as especially suitable for administration of said gums or mucilages to patients in need of the cholesterol-binding effect of these substances. It would, of course, not come into consideration to include it as a bread replacement in a standard diet for diabetics who are not in hypercholesterolaemi therapy. Furthermore, the flour content of the product, which apparently typically comprises 20–50%, calculated on dry solids, will prevent the maintenance of a low blood sugar concentration, since omittance of starch from bread has to be almost total to be reflected in a significantly reduced blood sugar concentration as substantiated and further explained below.

U.S. Pat. No. 4,442,132 relates to pastry for diabetics, which contains less than 10% of digestible carbohydrates and which is manufactured from a dough primarily comprising whole egg or egg albumin, calcium caseinate, wheat flour in an amount of up to 15%, chopped nuts, and 5–50% by weight of a sugar alcohol selected among lactitol, sorbitol, and xylitol. Thus, a cookie-like, brittle product is dealt with, which does not have the appearance of bread and which, apart from the nut addition, does not contain food fibres. Even if the product is stated to be suitable for diabetics it obviously cannot serve as a proper bread replacement.

Many other products in which, with various objects in mind, the flour has been completely or partly replaced by other materials, have been proposed, however, for the reasons explained above none of them are suitable for totally or partly replacing of bread on an isocaloric basis.

SUMMARY OF THE INVENTION

According to the present invention it has, however, turned out that by the use of the ingredients defined below, which are all natural food ingredients, in the proportions specified, it is possible to obtain a bread-like product that fulfils the conditions specified above for a bread replacement for diabetics, which makes it suitable as an isocaloric substitute for bread in a diabetic diet. Furthermore, it has turned out that consumption of the bread by diabetics yields a surprisingly efficient and protracted reduction of blood sugar concentration, as further explained below.

The product according to the invention is characterized in that it is manufactured by baking a dough comprising the following ingredients:

(a) comminuted soya protein,
 (b) a fibre component comprising at least 50% by weight of wheat bran,
 (c) vegetable oil,
 (d) a fat-containing, substantially starch-free nut and/or kernel component,
 (e) a preferably viscous, possibly protein enriched, low-fat sour milk product, optionally in the form of a dry powder, (f) egg white, possibly in the form of a dry powder, and
(g) a leavening agent, the weight ratios between the ingredients, calculated on dry matter, being as follows:
(a) to (b) from 0.3 to 3 (understood as the value of a/b being in the interval from 0.3 to 3),
((a)+(b)) to (c) from 3 to 8,
((a)+(b)) to (d) from 3 to 7,
((a)+(b)+(d)) to (e) from 8 to 12 and
((a)+(b)+(d)) to (f) from 12 to 20.

In addition to the said ingredients (a)–(g), common ancillary materials including salt may be used in the manufacture of the dough, and for mixing of the dough water or milk including skimmilk or buttermilk is used.

BRIEF DESCRIPTION OF THE DRAWINGS

The present invention will be further understood with reference to the drawing, wherein.

DETAILED DESCRIPTION OF THE INVENTION

Figure 1:
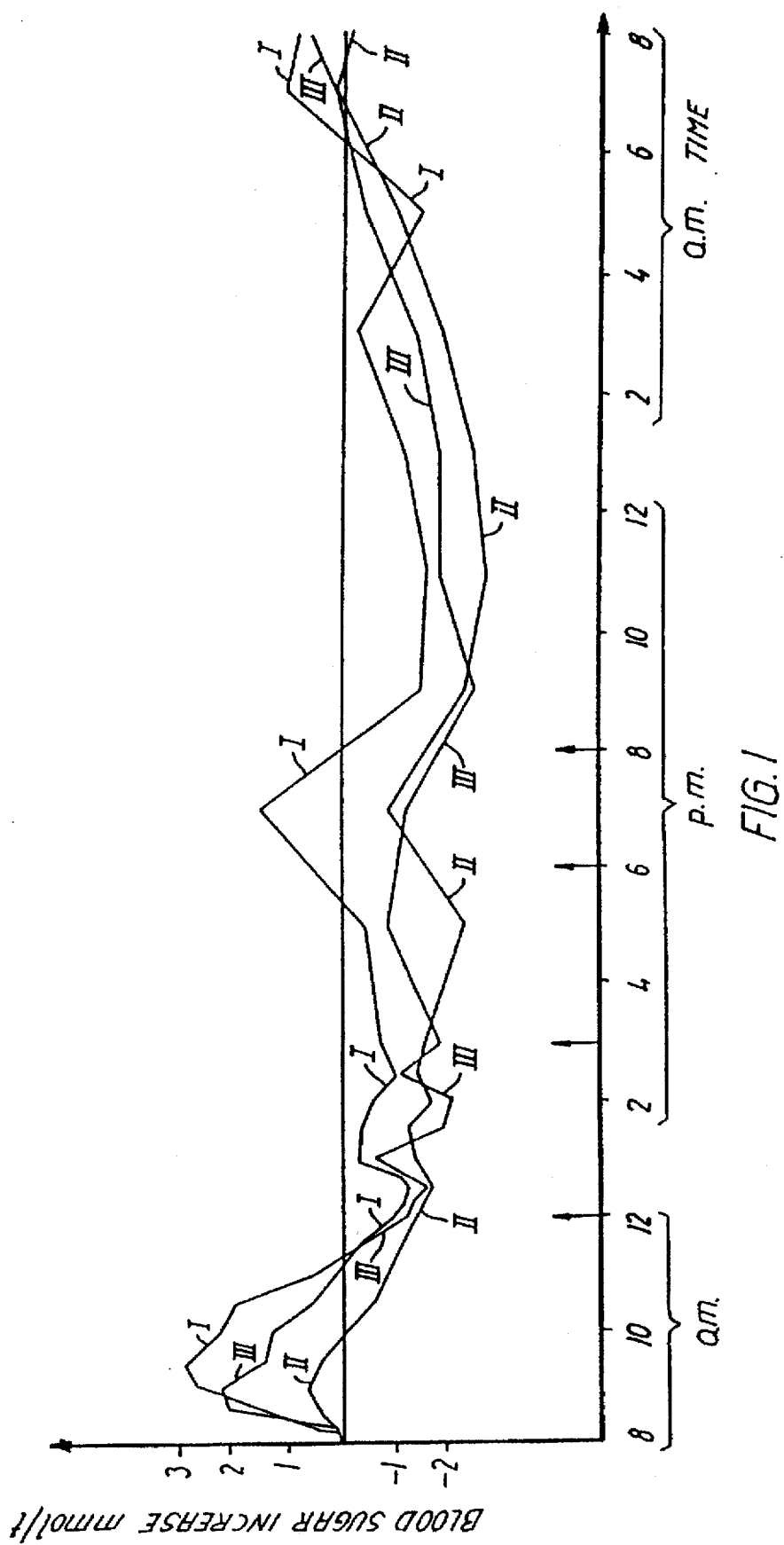
FIG. 1 is a graph of the change in a patient's blood sugar over time upon consumption of an ordinary diet (I), of the product of the present invention (II), and upon a return to the ordinary diet (III)

In a preferred embodiment the ingredients are incorporated in the following ratios:

(a) to (b) from 0.5 to 2,
((a)+(b)) to (c) from 2 to 7,
((a)+(b)) to (d) from 4 to 6,
((a)+(b)+(d)) to (e) from 9 to 11 and
((a)+(b)+(d)) to (f) from 14 to 18.

In connection with the individual ingredients the following details should be noted:

(a): Soya protein is selected partly on account of its excellent nutritional properties and its amino acids composition in particular, partly because together with the other ingredients it makes it possible to obtain a bread-like texture without the use of flour.

(b): At least 50% of the fibre component comprises wheat bran. With a content of almost 40% indigestible food fibres wheat bran provides a suitable amount of these in the finished bread and it is particularly the wheat bran that provides bread taste to the product. If it is desired to make this bread taste less intense or if a lighter type of bread is required, taste-neutral fibres may comprise up to 50% of the fibre component, particularly ground wheat straw cellulose known as "wheat fibres" coming into consideration.

(c): From a baking standpoint and considering the requirements to the organoleptic properties and the texture of the finished bread almost any edible vegetable oil may be used and this may therefore be selected exclusively out of nutritional and economic considerations. If it is desired to obtain a low ratio between the total cholesterol content and HDL-cholesterol of the blood an oil having a large content of mono-unsaturated fatty acids such as olive oil may be selected while, alternatively, a multi-unsaturated oil such as grape seed oil, corn oil or soya oil may be selected if a general lipid reducing effect is given the highest priority.

(d): This ingredient is primarily incorporated to obtain a good taste and texture of the finished bread, said ingredient together with ingredient (c) masking the organoleptically disadvantageous texture of the finished bread, which might otherwise be imparted to the product by the large content of the ingredients (a) and (b). The product exhibits what is generally known as a better mouth feel. The ingredient (d) may typically be desiccated coconut, which is free of starch and relatively inexpensive, but also other products such as sunflower seeds, sesame seeds etc. come into consideration.

(e): The low-fat sour milk product, which possibly may be protein enriched, is incorporated partly for nutritional reasons and partly to provide consistency and cohesion to the dough when the products are viscous. Examples of suitable sour milk products are Ymer or preferably Ylette®, which are protein enriched sour milk products manufactured from whole milk and low-fat milk respectively.

(f): The egg white serves as a natural binder, which is required as a substitute for the binding effect normally yielded to ordinary bread by the flour gluten and starch.

(g): The leavening agent is preferably yeast plus sugar in an amount which does not very much exceed that which is consumed by the yeast when acting as a leavening agent. The amount of yeast used will typically be a little larger than that used in conventional bread manufacture. Alternatively, the leavening agent may be baking powder or another chemical leavening agent.

The practical kneading and baking of the bread may take place by the use of conventional baking equipment.

In a typical process, at first dry blending of the solid ingredients is made and the yeast is stirred into water or milk with the chill off, the yeast is then added to the dry mix together with the egg white, the vegetable oil, the sour milk product, and water or milk until the consistency becomes like that of a thin dough.

If it is desired to reduce the phytine content of the wheat bran it is expedient to use a long leavening time at 20°–30° C. in order to utilize the phytase naturally present in the wheat bran for a reduction of the phytine content. It is assumed, however, that the amounts of the bread-like product according to the invention that an individual patient is expected to consume are hardly so large that the phytine content of the wheat bran would present any problems even if no particular measures are taken to enhance the effect of the phytase.

During the leavening period the dough should be protected against drying out. After completion of the leavening the dough is stirred briefly and poured into greased baking trays for example in a thickness of 1½–2 cm.

Baking takes place in a preheated oven at about 200° C. for a typical baking period of 25–30 minutes.

The baked bread is then removed from the oven and afterdried on a baking grill.

The finished bread-like product is in the form of a disk, which may be cut into suitable pieces. The resulting slices of bread are suitable for serving covered with garniture possibly after having had a little butter or margarine spread on them, such as the Scandinavian "smørre-brød".

Within the above-defined ratios between the ingredients, bread having an appearance varying between that of rye bread and graham bread may be made.

The product according to the invention is extremely suitable for freezing because as a consequence of the relatively high vegetable oil content it does not tend dry out.

Although the good keeping quality of the product makes it suitable for industrial manufacture with a view distribution in a frozen or non-frozen condition it is assumed, however, that a part of the consumers and the retail bakeries might wish to take care of the baking themselves and the invention therefore also relates to a powder mix, which upon stirring with water and vegetable oil forms a dough, that may be baked to a bread-like product having blood sugar reducing effect for diabetics, said mix being characterized in that it comprises the above-defined ingredients (a), (b), (d), (e), (f), and (g), the ingredients (e) and (f) being in the form of dry products and (g) being either dried yeast plus sugar or a baking powder, said ingredients being present in the mix in the above-defined proportions.

When using this mix only vegetable oil has to be added in an amount as described above, i.e. in such an amount that the ratio of ((a)+(b)) to vegetable oil is 3 to 8, preferably 2 to 7, together with water or milk to obtain the desired dough consistency. The remaining preparation is as described above.

The products according to the invention have been developed particularly for diabetics, but it is assumed that they can also be useful for the prevention of so-called adult-onset diabetes. Furthermore, the suitable distribution of nutritional ingredients in the products makes them particularly beneficial also to healthy persons, for example for a slimming treatment, which implies reduction of the carbohydrate consumption.

To further illustrate the invention, examples are presented below, which describe the manufacture of typical bread replacing products according to the invention together with test results, which illustrate the beneficial physiological effect achieved with diabetics that consume the product.

EXAMPLE 1

The following ingredients were mixed together:

| | |
|---|---|
| Soya protein | 36 g |
| Wheat bran | 30 g |
| Desiccated coconut | 14 g |
| Sugar | 2.5 g |
| Salt | 1.5 g |

20 g of compressed yeast was stirred into 50 g of lukewarm water and added to 80 g Ylette®, 50 g of raw egg white, and 18 g of soya oil. A further 250 g of water were added to obtain a thin dough.

The dough was covered and set aside to rise at approximately 20° C. for 1¼ hour, stirred through and poured into a greased tray to form an approximately 2 cm thick layer. Baking took place in a preheated oven at 200° C. for ½ hour, the bread-like product was then taken out of the tray and afterdried upside down for approximately 10 minutes in the warm switched-off oven.

The resulting product was pleasant to the taste, easy to chew and with characteristics similar to graham bread.

EXAMPLE 2

A powder mix was manufactured by mixing the following ingredients:

| | |
|---|---|
| Soya protein | 38 g |
| Desiccated coconut + sesame seeds (1:1) | 14 g |
| Dried yeast | 12 g |
| Salt | 1.5 g |
| Sugar | 2.5 g |
| Egg white powder | 6 g |
| Wheat bran | 30 g |

The obtained mix is suitable for distribution as such, as just by adding vegetable oil, e.g. 12 g of olive oil+6 g of soya oil, and water or milk to an adequate consistency it will provide a dough, which, when treated as described in example 1, will yield a product of the same quality as the one obtained in example 1.

The particularly suitable composition of the product according to the invention from a nutritional standpoint is evident from the analytical results described below, at which the product manufactured according to example 1 has been compared with conventional types of bread:

| Per 100 g | Product accord. to example 1 | Rye bread | Graham bread | White bread |
|---|---|---|---|---|
| Analysis | | | | |
| Energy, kJ | 974 | 960 | 1150 | 1135 |
| Energy, kcal | 232 | 229 | 274 | 270 |
| Protein, g | 11;3 | 5;8 | 8;2 | 7;7 |
| Fat, g | 13;6 | 1;6 | 3;7 | 3;3 |
| Saturated fatty acids, g | 4;4 | 0;2 | 0;7 | 0;9 |
| Mono-unsaturated fatty acids, g | 2;6 | 0;2 | 0;6 | 0;6 |
| Poly-unsaturated fatty acids, g | 5;7 | 0;8 | 1;6 | 1;0 |
| Cholesterol, mg | 1;4 | 0;0 | 0;0 | 0;0 |
| Carbohydrates total, g | 15;9 | 47;1 | 51;2 | 51;7 |
| Sugar, g | 3;7 | 3;8 | 1;9 | 0;8 |
| Fibers, g | 8;4 | 9;1 | 4;9 | 3;2 |
| Starch, g | 1;6 | 35;7 | 36;1 | 48;7 |
| Ash, g | 2;3 | 2;8 | 1;8 | 2;1 |
| Water, g | 47;4 | 42;3 | 34;4 | 34;5 |
| Fatty Acids | | | | |
| C 18:2, g | 5;0 | 0;7 | 1;5 | 0;9 |
| C 18:3, g | 0;7 | 0;1 | 0;1 | 0;1 |
| C 20:4, g | 0;0 | 0;0 | 0;0 | 0;0 |
| C 18:1, g | 2;6 | 0;2 | 0;5 | 0;0 |
| Amino Acids | | | | |
| Isoleucine, mg | 560 | 230 | 320 | 330 |
| Leucine, mg | 984 | 410 | 550 | 580 |
| Lycine, mg | 789 | 210 | 230 | 190 |
| Methionine, mg | 250 | 95 | 120 | 120 |
| Cystine, mg | 197 | 99 | 120 | 150 |
| Phenylalanine, mg | 591 | 280 | 370 | 410 |
| Tyrosine, mg | 432 | 120 | 160 | 180 |
| Threonine, mg | 470 | 210 | 220 | 230 |
| Tryptophan, mg | 155 | 68 | 95 | 81 |
| Valine, mg | 686 | 340 | 400 | 390 |
| Arginine, mg | 773 | 270 | 370 | 310 |
| Histidine, mg | 310 | 140 | 170 | 180 |
| Alanine, mg | 575 | 290 | 300 | 260 |
| Aspartic acid, mg | 1207 | 410 | 450 | 370 |
| Glutamic acid, mg | 2137 | 1350 | 2330 | 2470 |
| Glycine, mg | 495 | 280 | 330 | 320 |
| Proline, mg | 684 | 550 | 780 | 890 |
| Serine, mg | 653 | 280 | 390 | 410 |
| Ca; mg | 90;1 | 30;0 | 30;0 | 30,0 |
| P, mg | 273;1 | | 230;0 | 88,0 |
| Mg, mg | 99;4 | 55;0 | 50;4 | 22,0 |
| Fe, mg | 2;2 | 4;2 | 4;7 | 3,2 |
| Zn, mg | 2;7 | 0;2 | 2;0 | 0,6 |
| Cu, mg | 0;4 | 0;2 | 0,3 | 0,1 |
| I, mg | 12;1 | 2;7 | 2;0 | 2,8 |
| Mn, mg | 1;9 | | 1;2 | 0,6 |
| Cr, µg | 1;1 | | 60;0 | 3,0 |
| Se, µg | 0;5 | | 41;0 | 2,0 |
| Mo, µg | 2;1 | | 32;0 | 0,0 |
| Na, mg | 238;0 | 700;0 | 287;0 | 325,0 |
| K, mg | 523;6 | 300;0 | 217;0 | 146,0 |
| Vitamin A, ret. eqv. µg | 5;7 | | | 25,0 |
| Retinol, µg | 3;9 | | | |
| β-carotene, µg | 10;5 | | | |
| Vitamin D, mg | 0;04 | | | |

-continued

| Per 100 g | Product accord. to example 1 | Rye bread | Graham bread | White bread |
|---|---|---|---|---|
| Vitamin E, mg | 4;3 | 0;3 | 0;3 | 0,5 |
| α-Tocopherol, mg | 3;3 | 0;2 | 0;3 | 0,5 |
| Vitamin $K_1$, µg | 34;3 | | | |
| Vitamin, mg | 0;3 | 0;1 | 0;4 | 0,4 |
| Vitamin $B_2$, mg | 0;3 | 0;1 | 0;5 | 0,5 |
| Niacin equiv., mg | 6;6 | 1;1 | 1;1 | 1,3 |
| Niacin, mg | 4;0 | 1;1 | 2;5 | 1,0 |
| Tryptophan, mg | 155;0 | 68;0 | 95;0 | 81,0 |
| Vitamin $B_6$, mg | 0;3 | 0;2 | 0;2 | 0,1 |
| Folacin, µg | 323;6 | 23;0 | 54;0 | 36,0 |
| Free folate, µg | 24;3 | 7;0 | 17;0 | 8,0 |
| Vitamin $B_{12}$, µg | 0;2 | 0;2 | | |
| Pantothenic acid, mg | 0;8 | 0;6 | 0;8 | 0,5 |
| Biotin, µg | 5;8 | 3;0 | 6;0 | 4,8 |
| Vitamin C, mg | 0;1 | | | |

Clinical Tests

The surprising blood reducing effect of the product according to the invention has been demonstrated with several patients with non-insulin-dependent diabetes. Thus, tests were made with a group of 10 patients at the age of 54 to 58 years. The comparative meals used comprised ordinary types of bread with a fibre content of 3.5% (standard deviation±1.4%) and a starch content of 27.3% (standard deviation±6.8%), butter, cheese, milk product, and marmalade. At the tests the conventional bread was replaced by an iso-caloric amount of bread manufactured according to example 1 (approx. 80–90 g), all the other ingredients remaining unchanged. The meals were taken in a randomized sequence at intervals of at least two days. Blood tests were taken prior to the meals and for every 15 minutes during the first hour and then every 30 minutes during the following 3 hours after the meals. The patients served as a comparative basis themselves.

At these tests such an increase of the area under the graph showing bloodsugar as a function of time was observed, that was equivalent to 630 mmol/l (standard deviation±258 mmol/l) per minute after intake of a comparative meal, and an increase of 182 mmol/l (standard deviation 154 mmol/l) per minute after intake of bread manufactured according to example 1. The increase in the maximum values of the blood sugar concentration was on an average 4.6 mmol/l (standard deviation±1.3 mmol/l) after intake of the control meal, and 1.5 mmol/l (standard deviation±0.7 mmol/l) after intake of the product according to example 1.

Tests with the product according to the invention have surprisingly shown that the blood sugar reducing effect is not limited to the hours between the intake of the product and the following meal. This is evident from FIG. 1, which shows the change in the blood sugar concentration with a diabetic patient during 24 hours.

The arrows indicated at the times of 8 a.m., noon, 3 p.m., 6 p.m., and 8 p.m. indicate the time of the meals.

The three graphs I, II and III refer to the same patient. The graph I shows the results after the intake of ordinary diabetic diet. The graph II shows the results found after the patient during 6 weeks in the breakfast had replaced the conventional bread in iso-caloric amounts by a product manufactured according to example 1.

The graph III is based on values obtained when the patient after two weeks following that period returned to the ordinary diabetic diet.

The results of FIG. 1 suggest a long-acting effect of the product according to the invention apparently not only ascribable to the fact that the product is poor in starch. The mere fact that the advantageous effect exceeds the time for the next meal when starch is eaten suggests that also factors other than the low starch content are important for the good results.

Tests have shown, however, that even a relatively small amount of starch can considerably impair the desired blood sugar reducing effect of the product in question.

At those tests the blood sugar increase with a patient was compared on test days when the following products were given as bread:

(i) ordinary bread baked from conventional starch containing flour, (ii) a bread-like product according to the invention, or (iii) a bread-like product corresponding to the product according to the invention, but made with an addition of wheat flour in an amount equivalent to 7.7 g flour in the amount of the product consumed for breakfast.

Figure 2:
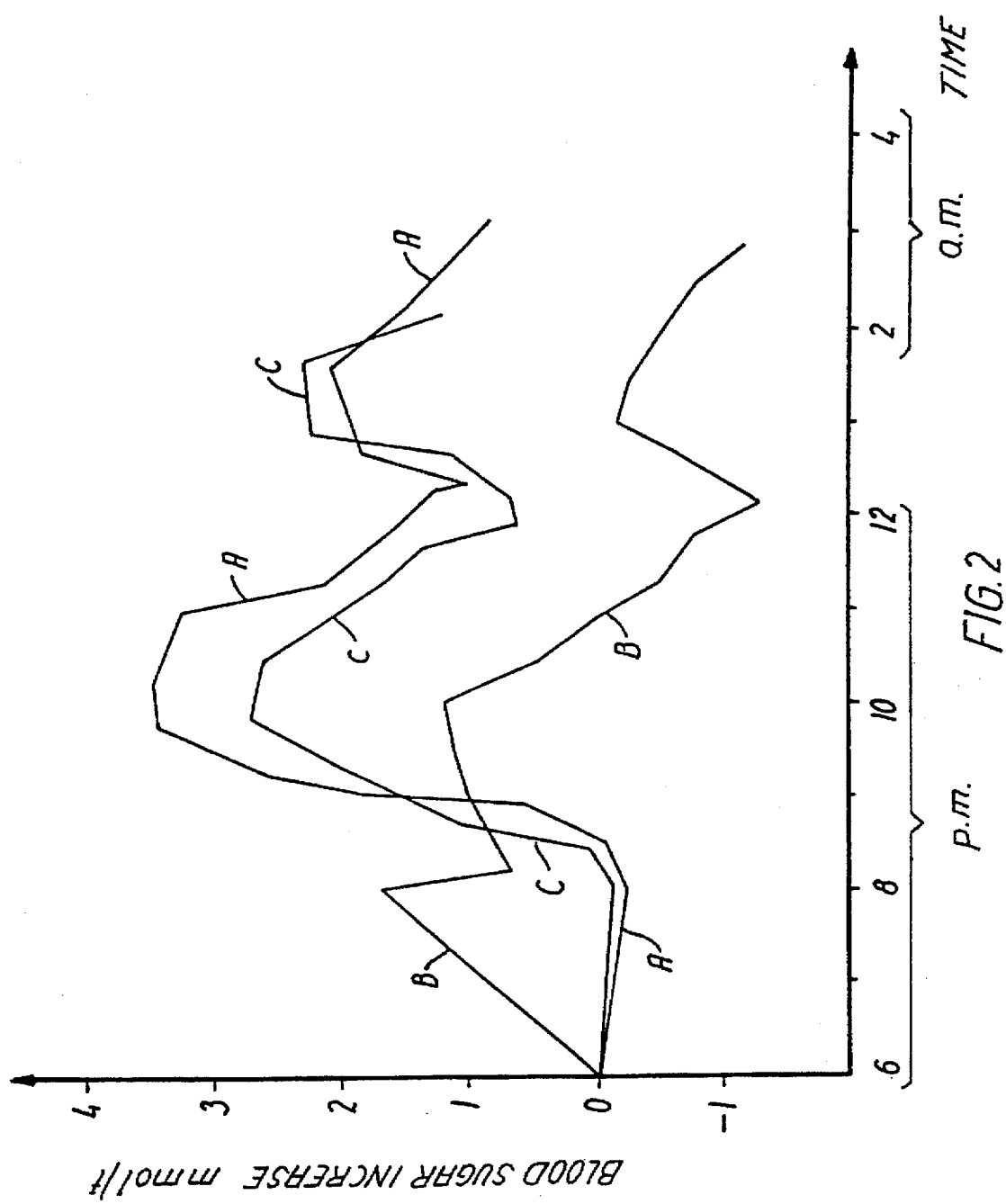
FIG. 2 is a graph of the change in a patient's blood sugar over time upon consumption of an ordinary diet (A), of the product of the present invention (B), and of the product of the present invention (C) made with an addition of wheat flour.

The results are illustrated in FIG. 2, in which the graph A shows The results obtained with ordinary bread, the graph B shows the results with the bread-like product according to the invention and graph C the results with the product according to the invention with addition of wheat flour. The breakfast was taken at about 8 a.m. and a lunch meal, which was identical in all three tests and conventionally composed, was served at about noon.

FIG. 2 confirms the blood sugar reducing effect of the product according to the invention, but it is particularly interesting by showing that even a minor amount of flour added to the product makes its useful effect compared with ordinary bread almost disappear. On the basis hereof it can be concluded that the numerous known protein enriched types of bread, in which only a partial replacement of flour by protein or a similar product has been made, are unsuitable for treatment of diabetes.

I claim the following:

1. A baked product having a blood sugar reducing effect for diabetics and having taste, texture and appearance similar to bread made from flour, said product manufactured by baking a dough consisting essentially of the following ingredients:

(a) soya protein, (b) a fiber component comprising at least 50% by weight of wheat bran, (c) vegetable oil, (d) a fat-containing, substantially starch-free nut and/or kernel component, (e) a low-fat sour milk product, (f) egg white, and (g) a leavening agent, said ingredients have weight ratios, calculated on dry matter, as follows:.

(a):(b) from 0.3:1 to 3:1, ((a)+(b)):(c) from 3:1 to 8:1, ((a)+(b)):(d) from 3:1 to 7:1, ((a)+(b)+(d)):(e) from 8:1 to 12:1, and ((a)+(b)+(d)):(f) from 12:1 to 20:1;

wherein said baked product is isocaloric compared to conventional bread.

2. A baked product according to claim 1, wherein the ratios by weight of said ingredients defined in claim 1 are as follows:

(a):(b) from 0.5:1 to 2:1, ((a)+(b)):(c) from 2:1 to 7:1, ((a)+(b)):(d) from 4:1 to 6:1, ((a)+(b)+(d)):(e) from 9:1 to 11:1, and ((a)+(b)+(d)):(f) from 14:1 to 18:1.

3. A baked product according to claim 1, wherein said fiber component in ingredient (b) contains 100% by weight of wheat bran.

4. A baked product according to claim 1, wherein said ingredient (c) is olive oil and/or an oil containing a mainly poly-unsaturated fatty acid component.

5. A baked product according to claim 1, wherein said ingredient (d) is selected from the group consisting of desiccated coconut, sunflower, sesame seeds and a mixture thereof.

6. A baked product according to claim 2, wherein said fiber component in ingredient (b) contains 100% by weight of wheat bran.

7. A baked product according to claim 2, wherein said ingredient (c) is olive oil and/or an oil containing a mainly poly-unsaturated fatty acid component.

8. A baked product according to claim 3, wherein said ingredient (c) is olive oil and/or an oil containing a mainly poly-unsaturated fatty acid component.

9. A baked product according to claim 2, wherein said ingredient (d) is selected from the group consisting of desiccated coconut, sunflower, sesame seeds and a mixture thereof.

10. A baked product according to claim 3, wherein said ingredient (d) is selected from the group consisting of desiccated coconut, sunflower, sesame seeds and a mixture thereof.

11. A baked product according to claim 4, wherein said ingredient (d) is selected from the group consisting of desiccated coconut, sunflower, sesame seeds and a mixture thereof.

12. The baked product according to claim 1, wherein said baked product contains no flour.

13. A powder mix, which upon stirring with water and vegetable oil forms a dough, that may be baked to a based product having a blood sugar reducing effect for diabetics and having taste, texture and appearance similar to bread made from flour, said mix consisting essentially of the ingredients (a) soya protein, (b) a fiber component comprising at least 50% by weight of wheat bran, (d) a fat-containing, substantially starch-free nut and/or kernel component, (e) a low-fat sour milk product, (f) egg white, and (g) a leavening agent, the ingredients (e) and (f) being in the form of dry products and (g) being either dried yeast plus sugar or a baking powder, the weight ratios of said ingredients, calculated on dry matter, being as follows:

(a):(b) from 0.3:1 to 3:1, (a)+(b)):(d) from 3:1 to 7:1, ((a)+(b)+(d)):(e) from 8:1 to 12:1, and ((a)+(b)+(d)):(f) from 12:1 to 20:1;

wherein said baked product is isocaloric compared to conventional bread.

14. A powder mix according to claim 13, wherein the ratios by weight of said ingredients are as follows (a):(b) from 0.5:1 to 2:1, ((a)+(b)):(d) from 4:1 to 6:1, ((a)+(b)+(d)):(e) from 9:1 to 11:1 and ((a)+(b)+(d)):(f) from 14:1 to 18:1.

15. The powder mix according to claim 13, wherein said powder mix contains no flour.

* * * * *